(12) United States Patent
Dennis et al.

(10) Patent No.: US 7,437,575 B2
(45) Date of Patent: Oct. 14, 2008

(54) LOW POWER MODE FOR DEVICE POWER MANAGEMENT

(75) Inventors: Lowell Browning Dennis, Pflugerville, TX (US); Andrew A. Walker, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 442 days.

(21) Appl. No.: 10/447,852

(22) Filed: May 29, 2003

(65) Prior Publication Data

US 2004/0243858 A1    Dec. 2, 2004

(51) Int. Cl.
*G06F 1/00* (2006.01)
*G06F 1/26* (2006.01)

(52) U.S. Cl. .................. 713/300; 713/320; 713/324

(58) Field of Classification Search ............. 713/320, 713/324, 300
See application file for complete search history.

(56) References Cited

U.S. PATENT DOCUMENTS

| | | | |
|---|---|---|---|
| 5,708,820 A * | 1/1998 | Park et al. .............. | 713/323 |
| 6,052,793 A * | 4/2000 | Mermelstein ............. | 713/340 |
| 6,115,815 A * | 9/2000 | Doragh et al. ........... | 713/2 |
| 6,122,748 A * | 9/2000 | Hobson ................. | 713/323 |
| 6,266,776 B1 * | 7/2001 | Sakai .................. | 713/300 |
| 6,360,327 B1 * | 3/2002 | Hobson ................. | 713/320 |
| 6,393,570 B1 * | 5/2002 | Henderson et al. ....... | 713/310 |
| 6,477,655 B1 * | 11/2002 | Delvaux et al. .......... | 713/323 |
| 6,665,802 B1 * | 12/2003 | Ober .................. | 713/324 |
| 6,732,280 B1 * | 5/2004 | Cheok et al. ........... | 713/300 |
| 6,848,057 B2 * | 1/2005 | Hicok ................. | 713/320 |

OTHER PUBLICATIONS

"PCI Bus Power Management Interface Specification", PCI Special Interest Group, pp. 2-71, Dec. 18, 1998.
"Platform PCI Compliance Test Adapter External Design Specification", Intel Corporation, pp. 2-12, Jun. 18, 1999.
George Lakkas and Bogdan Duduman, "The ACPI Advantage for Powering Future-Generation Computers", www.ednmag.com, pp. 91-94, Sep. 20, 2001.
"Power Saving of Using USB Selective Suspend Support Whitepaper", Intel Corporation, pp. 1-7, Nov. 1, 2002.
"Power Management", http://website.lineone.net, pp. 1-2, Printed Mar. 18, 2003.
"PCI Power Management", http://www.charmed.com, pp. 1-6, Printed Mar. 18, 2003.
"Cut Power Use and Extend Battery Life with Standby and Hibernate", http://www.microsoft.com, pp. 1-6, Printed Mar. 18, 2003.

* cited by examiner

*Primary Examiner*—Rehana Perveen
*Assistant Examiner*—Stefan Stoynov
(74) *Attorney, Agent, or Firm*—Baker Botts L.L.P.

(57) ABSTRACT

An information handling system having PCI devices which comply with the Power Management Interface Specification have a low power mode that may be used to put Power Management Capability devices into a low power state when the information handling system enters into S4 or S5. A firmware or software low power mode program, retained in non-volatile memory of the information handling system, recognizes when the information handling system is entering S4 or S5. The low power mode program may clear the Power Management Event Enable or not in each of the Power Management Capable devices when the information handling system enters into S4 or S5.

12 Claims, 5 Drawing Sheets

LOW POWER MODE FOR DEVICE POWER MANAGEMENT

BACKGROUND OF THE INVENTION TECHNOLOGY

1. Field of the Invention

The present invention is related to information handling systems, and more specifically, to reducing power consumption of the information handling system when in various power states.

2. Background of the Related Technology

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Use of information handling systems in the office and at home have become ubiquitous and are rapidly becoming transparent to users of these information handling systems. More and more information handling systems are being deployed, and the capabilities and sophistication of these information systems have greatly increased in the last few years. With increased numbers, capabilities and sophistication, the electrical power required by these information systems has significantly increased. However, the full capabilities of the information handling systems may only be utilized a very small percentage of the total time that the systems are energized. Heretofore, to save electrical power the information handling system was manually shutdown. However, having to turn on the information handling system before use, and turn off after use was inconvenient or not performed.

New power saving technologies are being implemented in the latest information handling systems, e.g., instantly available personal computers (IAPCs). The Advanced Configuration and Power Interface (ACPI) specification provides a platform-independent, industry-standard approach to operating-system-based power management. The ACPI specification is a key constituent in Operating System Directed Power Management (OSPM). OSPM and ACPI may apply to all classes of information handling systems, e.g., computers, including handheld, notebook, desktop, and servers. In ACPI-enabled information handling systems, the Basic Input/Output System (BIOS), hardware and associated power architecture use a standard approach that enables the software operation system (OS) to manage the entire information handling system in all operational and power state transition situations.

An ACPI enabled OS can put the entire information handling system or parts of it in and out of various "sleep states," based on user settings and application requests. The sleep states may be invisible to the user, allowing substantial system power savings, but with instant accesses to areas of the information handling system when required. The ACPI specification defines six possible operating states, referred to as S0 to S5, in order of highest to lowest power consumption. The S0-S2 states are high power, the S3 state is low power, and the S4 and S5 states are minimal or no power. Different subsystems in the information handling system may have dedicated power sources that allow each subsystem or group of subsystems to be in various active (S0-S2), standby (S3) or sleep (S4-S5) states so as to maximize overall power savings, i.e., S0—system on; S1—central processing unit (CPU) stopped, not cycling, random access memory (RAM) is refreshed, the system is running is a low-power mode; S3—standby or suspend to RAM, hard drives are spun down and only RAM remains active; S4—hibernation or suspend to disk, all RAM data written to disk,—computer totally inactive; and S5—power to information handling system is off.

The lowest power consumption comes in the sleep states of S4 or S5, where the information handling system is virtually shutdown. However, these deep, power-saving states come with drawbacks. The more circuitry that is shut down to conserve energy, the longer it takes to restore the information handling system to operational status. Power-management challenges arise when these systems transition between these various states. For example, when a system is in an S3 state, in order to go to the S4 state, the system must first go to the S0 state and perform the required tasks before entering the S4 state. This is all performed with the ACPI enabled OS.

Older information handling systems could only rely upon power strips to completely turn power of to the system. This is costly and requires the user to remember to turn off the power strip.

There is a long felt need in the information handling system technologies, e.g., computer industry, to have systems that consume as little power as possible when they are in the S4 or S5 states. This is especially important to companies having large numbers of these systems. In fact, the U.S. government mandates that a system draw no more than two watts of power in the S4 or S5 states. Much of the future purchasing of new equipment quotations will favor low standby power consumption equipment.

Newer information handling systems have added hardware and firmware that allow the BIOS to turn off the various subsystems, e.g., onboard network interface controller (NIC), when going into an S4 or S5 state, for example, by setting a General Purpose Output (GPO) to a specific logic level to gate power to a subsystem. This feature is usually controlled via a "Low Power Mode" setup menu item. Enabling the Low Power Mode feature allows most computer systems to be low power compliant from the factory, but a user can easily take the system out of compliance by changing device driver settings and/or by adding devices to the computer system that draw larger amounts of power in the S4 or S5 states.

Therefore, a problem exists, and a solution is required so as to improve on how an information handling system handles a Low Power Mode setup.

SUMMARY OF THE INVENTION

The present invention remedies the shortcomings of the present technologies by providing a Low Power Mode feature in the BIOS firmware that does not suffer from the aforementioned shortcomings of the existing power saving technologies. This feature may be always on or enabled and disabled by some other means.

A PCI device that is compliant with the PCI Bus Power Management Specification will draw no more than 20 mA of current when the system is in S4 or S5 (PCI D3 state) and its PME_En bit is cleared. However, when the PME_En bit is set, the PCI device may draw up to 375 mA of current.

According to exemplary embodiments of the present invention, when a Low Power Mode is enabled in the information handling system and the system enters either the S4 or S5 state, the BIOS clears the PME_En bit for all the PCI devices that are compliant with the PCI Bus Power Management Interface Specification . The invention may be implemented in the BIOS firmware of an information handling system having PCI devices without requiring additional hardware support.

Low Power Mode may always be on, or may be activated by setting or clearing a bit (e.g., low power mode bit) in any type of non-volatile memory, e.g., electronically erasable read only memory (EEPROM) or FLASH memory. The non-volatile memory may be part of the BIOS or may be a status and/or configuration register in the information handling system. The low power mode bit may be set or cleared with, for example but not limited to, a power management user menu, a global network packet command, an activity timer, and/or a time of day clock.

The present invention is not limited to PCI Bus Power Management Interface Specification compliant devices. Any information handling system having power management capabilities may benefit from what is disclosed and claimed herein.

When an S4 or S5 state is initiated in the information handling system, the Low Power Mode bit is checked to see if the Low Power Mode has been enabled. If so, the BIOS firmware may walk the PCI bus(es) checking for the presence of PCI devices that have a PME_En bit. When such a PCI device is found, it may be further checked for multiple functions that may also have a PME_En bit.

According to an exemplary embodiment of the present invention, whenever a PCI device that has a PME_En bit is found, its PME_En bit is cleared (set to "0"). When the information handling system "wakes" or turns on from the S4 or S5 state, respectively, the appropriate PCI device driver will re-enable its respective PCI device, according to the PCI Bus Power Management Interface Specification, as described hereinafter.

According to the PCI Bus Power Management Interface Specification, incorporated by reference herein for all purposes, during the initial operating system loading each function's (PCI device) PME_En bit must be written with a "0," and each function's PME_Status bit must be written with a "1" by system software as part of the process of initializing the system. Thus, a properly written device driver would expect to have to reinitialize the PME_En bit of the device after an S4 resume or S5 start-up, and would not care if the BIOS had previously cleared the PME_En bit.

According to another exemplary embodiment, certain classes of PCI devices may not have their PME_En bit cleared when the system is in the S4 or S5 state. For example, NICs, modems, USB interface, keyboard interface, mouse interface, etc., may remain in an active mode, e.g., PME_En bit set, so that the information handling system can come out of the S4 or S5 state when an event is detected with one of these classes of PCI devices. This allows a more transparent awakening of the system upon the occurrence of an expected event, e.g., telephone ringing, network wake-up packet, user interfacing with the system.

A technical advantage of the present invention is reducing standby power in an information handling system to a minimum without requiring additional circuitry, which may be costly. Another technical advantage is automatically configuring devices having low power options to the lowest power mode when the information handling system is in a sleep (S4) or power down (S5) state. Another technical advantage is selectively configuring some of the devices to a low power mode and some other of the devices to remain in an active mode so as to be available when an expected wake-up event occurs. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
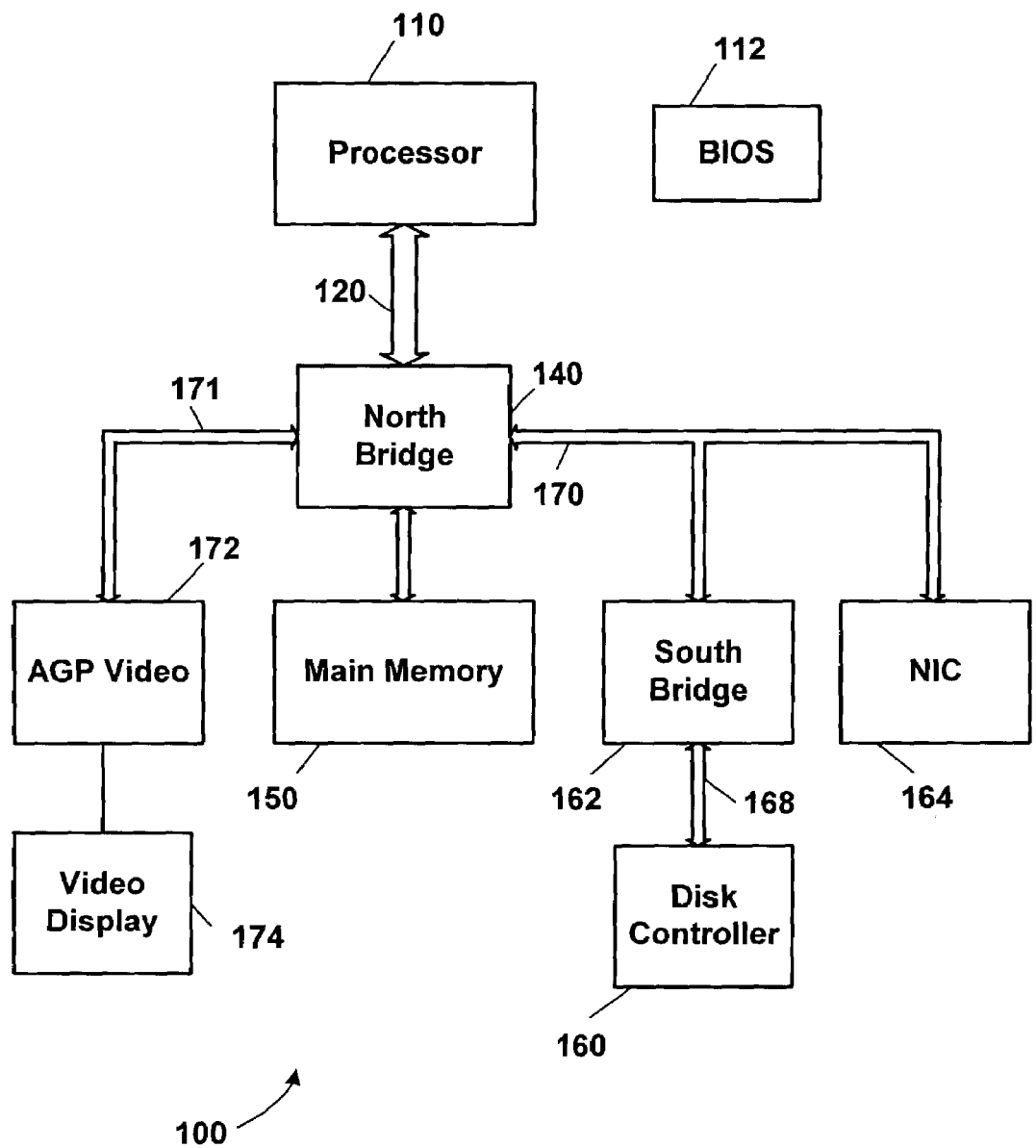
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises at least one processor 110 coupled to a host bus 120. A north bridge 140, which may also be referred to as a memory controller hub or a memory controller, is coupled to a main system memory 150. The north bridge 140 is coupled to the system processor 110 via the host bus 120. A basic input/output system (BIOS) 112 comprises firmware used during start-up of the information handling system 100, and for system hardware house keeping functions. The BIOS 112 may be any non-volatile memory, e.g., electronically erasable read only memory (EEPROM) or FLASH memory.

The north bridge 140 may be generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, and an AGP bus 171 coupled to a AGP graphics interface 172 which drives a video display 174.

The PCI bus 170 couples at least one PCI device, e.g., compliant with the PCI Bus Power Management Interface Specification, to the north bridge 140. A second bus(es) 168 may also comprise other industry standard buses or proprietary buses, e.g., ISA, SCSI, USB buses through a south bridge (bus interface) 162. These secondary buses 168 may have their own interfaces and controllers, e.g., ATA disk controller 160 and input/output interface(s) (not shown).

Figure 2:
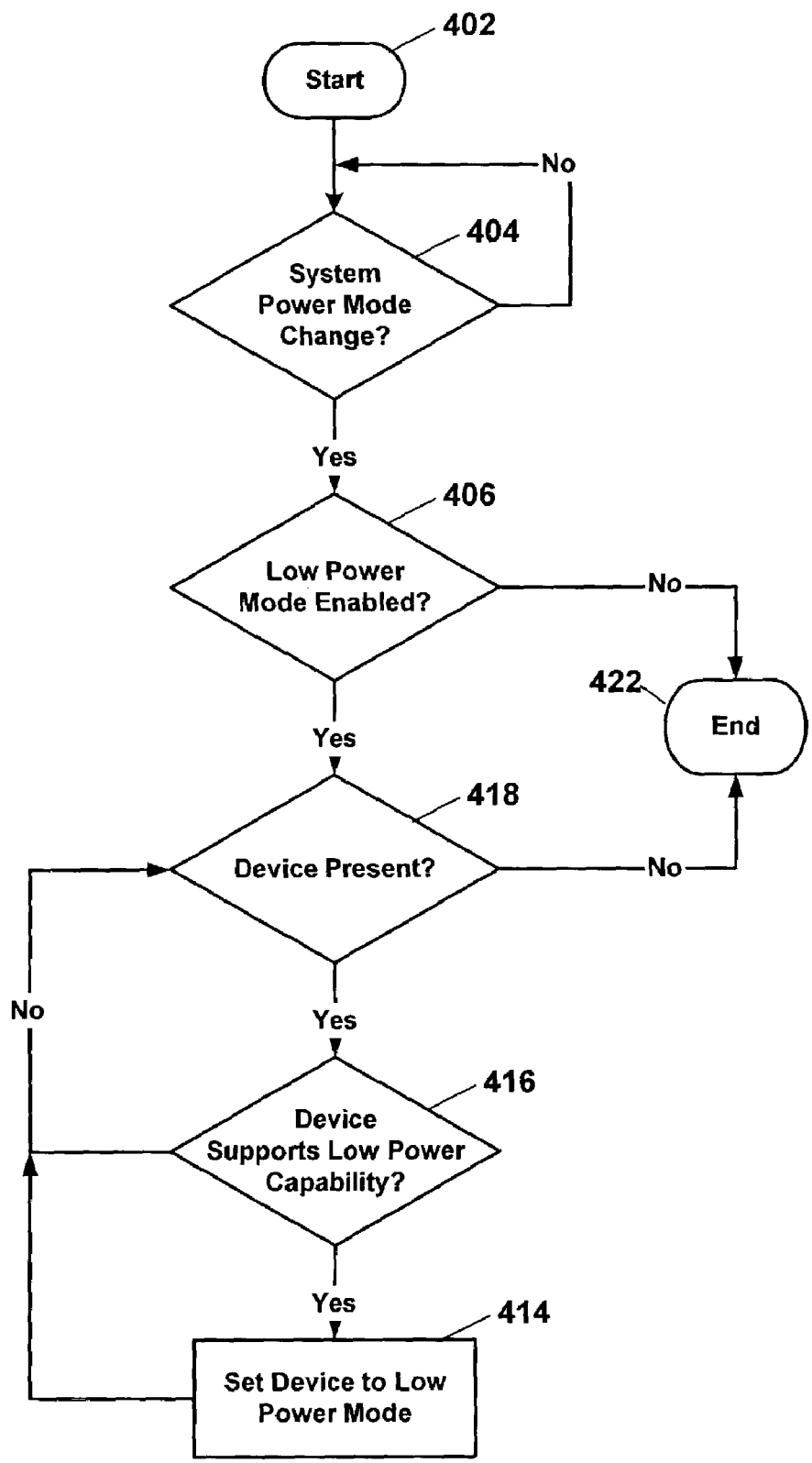
FIG. 2 is a schematic flow diagram of an exemplary embodiment of the present invention.

Referring to FIG. 2, depicted is a schematic flow diagram of an exemplary embodiment of the present invention. The inventive process starts at step 402, and a system power mode change is monitored in step 404. When a system power mode change is detected in step 404, step 406 determines whether a low power mode has been enabled in the system 100. If the low power mode was not enabled, the process ends at step 422.

If the low power mode was enabled, then step 418 determines whether a device is present in the system 100. If no device is present then the process ends at step 422. If a device is present then step 416 will determine whether the device supports low power capability. If the device does have low power capability then in step 414 the device is set to a low power mode. If the device does not support low power capability then the presence of a next device is determined in step 418. Steps 418, 416 and 414 continue until all devices in the system 100 are found, determined whether low power capability is supported and set to a low power mode. Then step 418 will finally determine that no more devices are present in the system 100 and the process ends in step 422. Step 402 (start) and step 422 (end) may be logically coupled so that the process of the invention is ready for any system power mode change that occurs in the system 100.

Figure 3A:
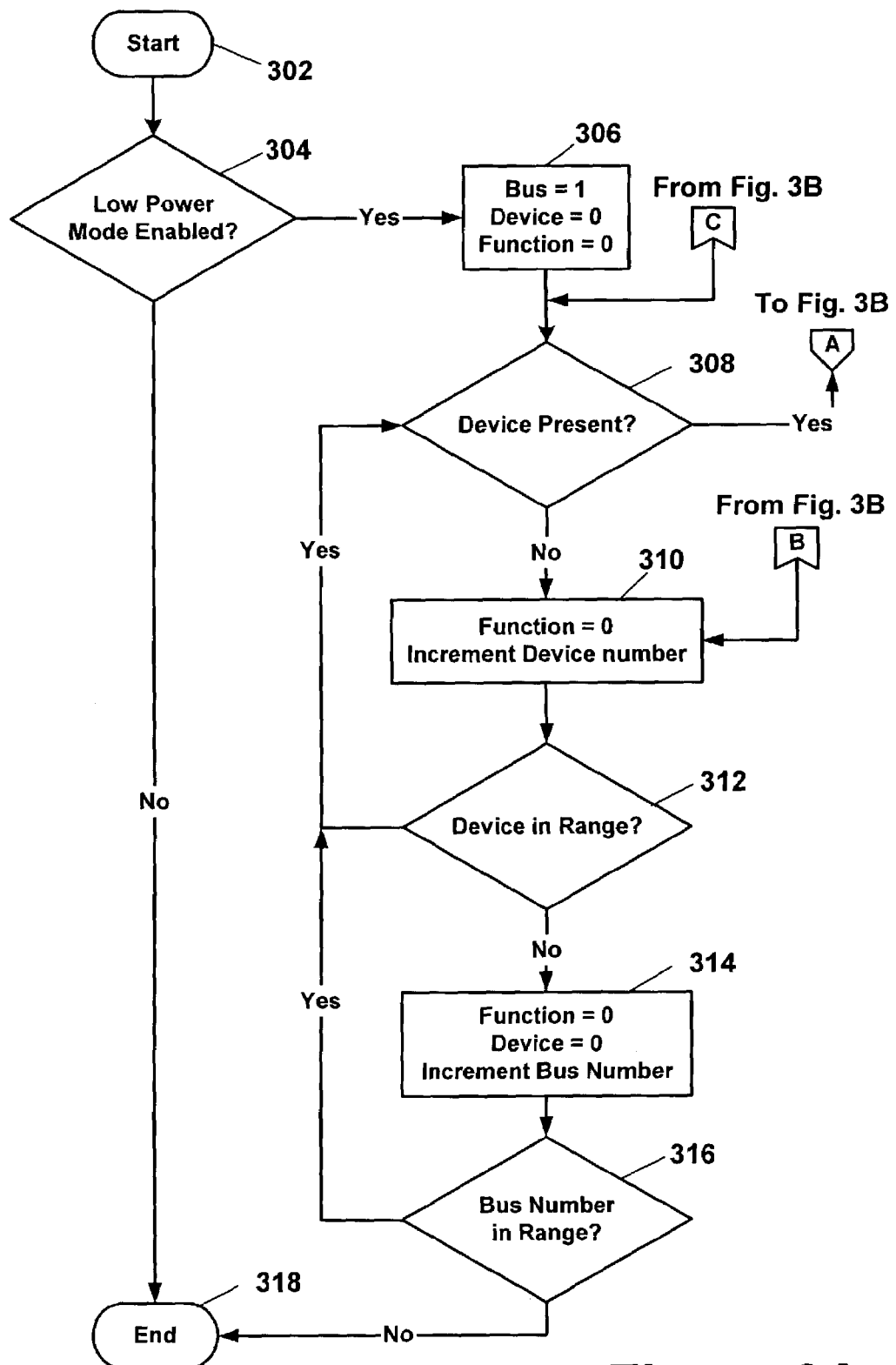
FIGS. 3A and 3B are a schematic flow diagram of another exemplary embodiment of the present invention.
Figure 3B:
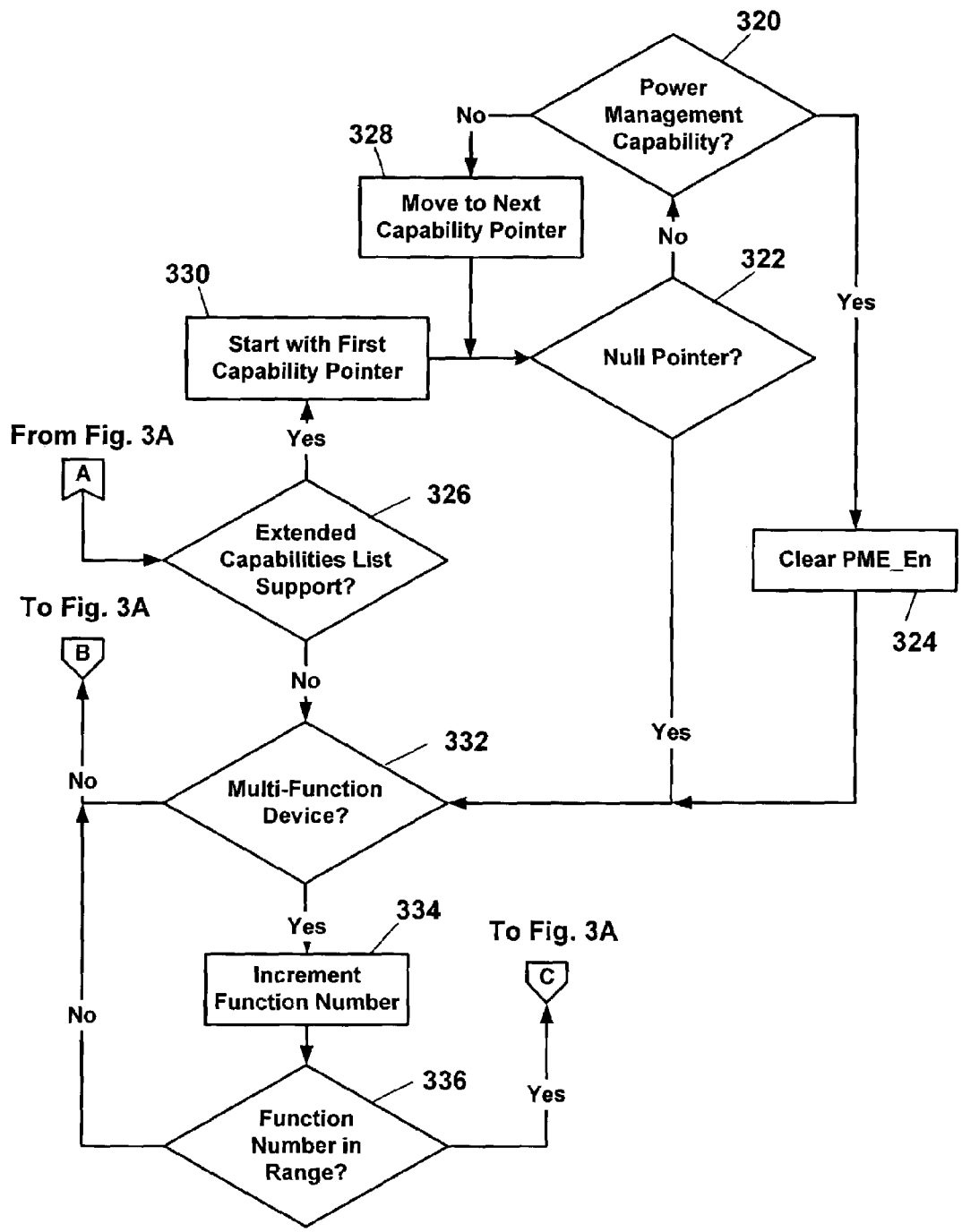

Referring to FIGS. 3A and 3B, depicted is a schematic flow diagram of another exemplary embodiment of the present invention, specifically for PCI devices. In the information handling system 100, according to the other exemplary embodiment of the present invention, a Power Management Event Interrupt is disabled during a system low power mode. The BIOS 112 may comprise firmware that clears the $PME_{13}En$ bit for all of the PCI devices that are compliant with the PCI Bus Power Management Specification when a low power mode is enabled in the information handling system 100 and the system enters either the S4 or S5 state.

The inventive process starts at step 302 whenever a system power mode change is detected. Step 304 determines whether a low power mode has been enabled in the system 100. If the low power mode was not enabled, the process ends at step 318. If the low power mode was enabled, then step 306 will check PCI bus=1 since there is no need to scan the host bus (bus=0). Step 306 begins "walking" the PCI bus looking for a PCI device 0 having a function 0. In step 308, a determination is made whether the PCI device 0 is found connected to the PCI bus 1. If the PCI device 0 is found then step 326 will determine whether the device supports an Extended Capabilities List. If an Extended Capabilities List is supported, then step 330 starts with the first Capability Pointer in the list and step 322 will check to see if this pointer is a "Null" pointer. If a "Null" pointer is not detected then step 320 will check if the Capability Pointer points to a Power Management Capability. If not, then step 328 will move to the next Capability Pointer and step 322 determines whether this is a "Null" pointer, if not, the Power Management Capability is checked for again in step 320. Steps 322, 320 and 328 continue to cycle until either a "Null" pointer is found in step 322, or the Power Management Capability is found in step 320.

Once the Power Management Capability is found, step 324 will clear the PME_En of the PCI device which causes that PCI device to draw no more than 20 mA of current in the S4 or S5 system power states. After the PME_En is cleared, step 332 checks to see if the PCI device is a multi-function device. If no multi-function device is found in step 332, the PCI device number is advanced in step 310, and the PCI device range is checked in step 312. If step 312 determines that the PCI device is in range then step 308 determines if the PCI device is present. If step 308 determines that the PCI device is present, then step 326 determines whether the PCI device has Extended Capabilities List support. If the PCI device supports an Extended Capabilities List then steps 330, 322, 320, 324 and/or 328 operate as described hereinabove.

If step 326 determines that the PCI device does not support an Extended Capabilities List then step 332 determines whether the PCI device is a multi-function device. If so, step 334 increments the function number and step 336 determines whether the new function number is in range. If the new function number is not in range then step 310 will increment the PCI device number and step 312 will determine whether the new PCI device number is in range. If not, then step 314 will increment the PCI bus number. Step 316 will check the new PCI bus number to see if it is in range, if not in range the process ends at step 318.

If the new PCI bus number is in range then step 308 will determine whether a PCI device is present on the new PCI bus. If step 308 determines that a PCI device is present, then steps 326, 330, 322, 320, 324, 328, 332, 334 and 336 will operate as described hereinabove. If step 308 determines that a PCI device is not present, then steps 310, 312, 314 and 316 will operate as described hereinabove.

Figure 4:
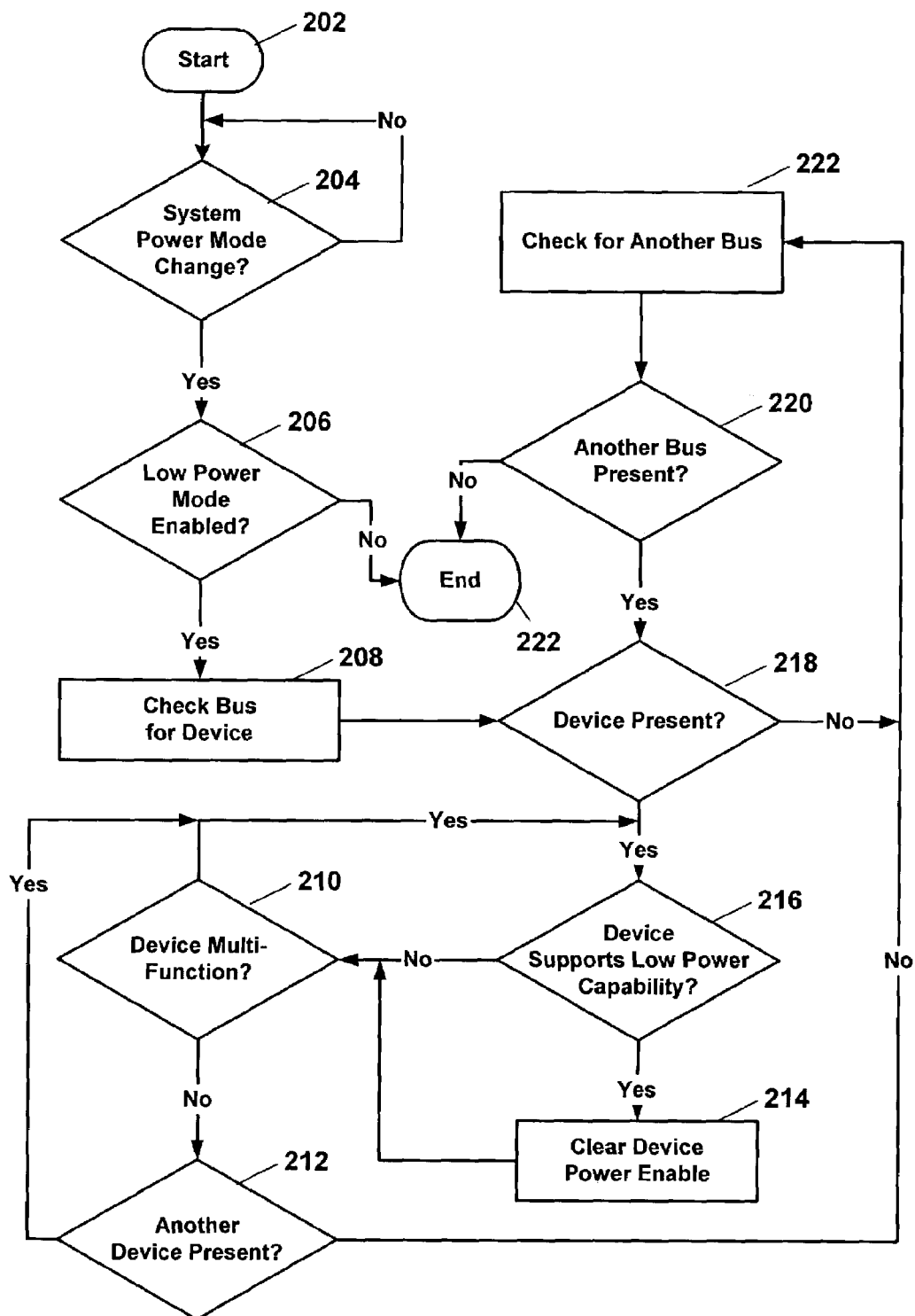
FIG. 4 is a schematic flow diagram of yet another exemplary embodiment of the present invention.

Referring to FIG. 4, depicted is a schematic flow diagram of yet another exemplary embodiment of the present invention. The inventive process starts at step 202, and a system power mode change is monitored in step 204. When a system power mode change is detected in step 204, step 206 determines whether a low power mode has been enabled in the system 100. If the low power mode was not enabled, the process ends at step 222.

If the low power mode was enabled, then step 208 will check a system device bus for a device connected thereto. If a device is found connected to the system device bus in step 218, then step 216 will determine whether the found device has a Power Management Capability (PMC). If the device does have a Power Management Capability (PMC) then in step 214 the device's Power Management Event Enable (PME_En) is cleared which causes the device to use a minimum amount of power. Regardless of whether the device has a Power Management Capability or not, step 210 checks whether the device is a multi-function device and if so, step 216 checks if at least one of the multi-functions of the device has a Power Management Capability. If step 216 finds at least one of the multi-functions of the device to have a Power Management Capability, then step 214 will clear the device's Power Management Event Enable of the at least one multi-function.

Step 212 checks if another device is present on the bus. If another device is found in step 212, then step 216 checks if this other device has Power Management Capability, and if so, step 214 will clear the Power Management Event Enable of the other device. Step 210 checks to see if the another device is a multi-function device, and if so, any of the multi-functions found will be checked for Power Management Capability and if found in steps 216 and 214, will have their Power Management Event Enable cleared as described hereinabove.

In step 212, when no more devices are found on the present bus, step 222 will begin checking for another system bus. Or if no device was found in steps 208 and 218, then step 222 will begin checking for another system bus. Step 220 checks if another bus is present, and, if so, step 218 determines if a device is on the other bus. The device is checked for Power Management Capability, etc., as described hereinabove for steps 216, 214, 210 and 212. When there are no more buses found, then step 220 will cause the process of the invention to end in step 222. Step 202 (start) and step 222 (end) may be logically coupled so that the process of the invention is ready for any system power mode change that occurs in the system 100.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having a low power mode, said system comprising:
    information handling equipment having at least one system low power mode;
    at least one peripheral device coupled to said information handling equipment having low power mode capability;
    a low power enable bit integral to said at least one peripheral device, wherein, when the low power enable bit is in a first logic state, said at least one peripheral device draws reduced power when said information handling equipment is in the at least one system low power mode; and
    a non-volatile memory in said information handling equipment, said non-volatile memory having a low power mode bit that is set when the information handling system is currently in a low power mode;
    a BIOS memory that includes software for setting the low power enable bit of the at least one peripheral device to a first logic level and thereby causing the at least one peripheral device to draw reduced power in response to the low power mode bit of the non-volatile memory being at a first logic level.

2. The information handling system according to claim 1, wherein the first logic level is a logic low.

3. The information handling system according to claim 1, wherein the first logic level is a logic high.

4. The information handling system according to claim 1, wherein the first logic state is a logic low.

5. The information handling system according to claim 1, wherein the first logic state is a logic high.

6. The information handling system according to claim 1, wherein said at least one device is PCI Bus Power Management Interface Specification compliant.

7. The information handling system according to claim 6, wherein the low power enable bit is a PME_En bit.

8. The information handling system according to claim 6, wherein said at least one device is a multi-function PCI device.

9. The information handling system according to claim 1, wherein said non-volatile memory is selected from the group consisting of battery backed-up complementary metal oxide silicon (CMOS) memory, non-volatile random access memory (NVRAM), and FLASH memory.

10. The information handling system according to claim 1, wherein said non-volatile memory is part of said information handling equipment's basic input/output system (BIOS) ROM.

11. The information handling system according to claim 1, wherein the at least one system low power mode is selected from the group consisting of Advanced Configuration and Power interface (ACPI) specification S4 and S5 states.

12. The information handling system according to claim 1, wherein said information handling equipment is selected from the group consisting of computer, personal computer workstation, portable computer, computer server, print server, network router, network hub, network switch, storage area network disk array, RAID disk system, and telecommunications switch.

* * * * *